Feb. 2, 1971    J. E. HOVIS ET AL    3,559,485
METHOD AND APPARATUS FOR TEMPERATURE MEASUREMENT
IN A METALLURGICAL FURNACE
Filed Feb. 25, 1969    3 Sheets-Sheet 2

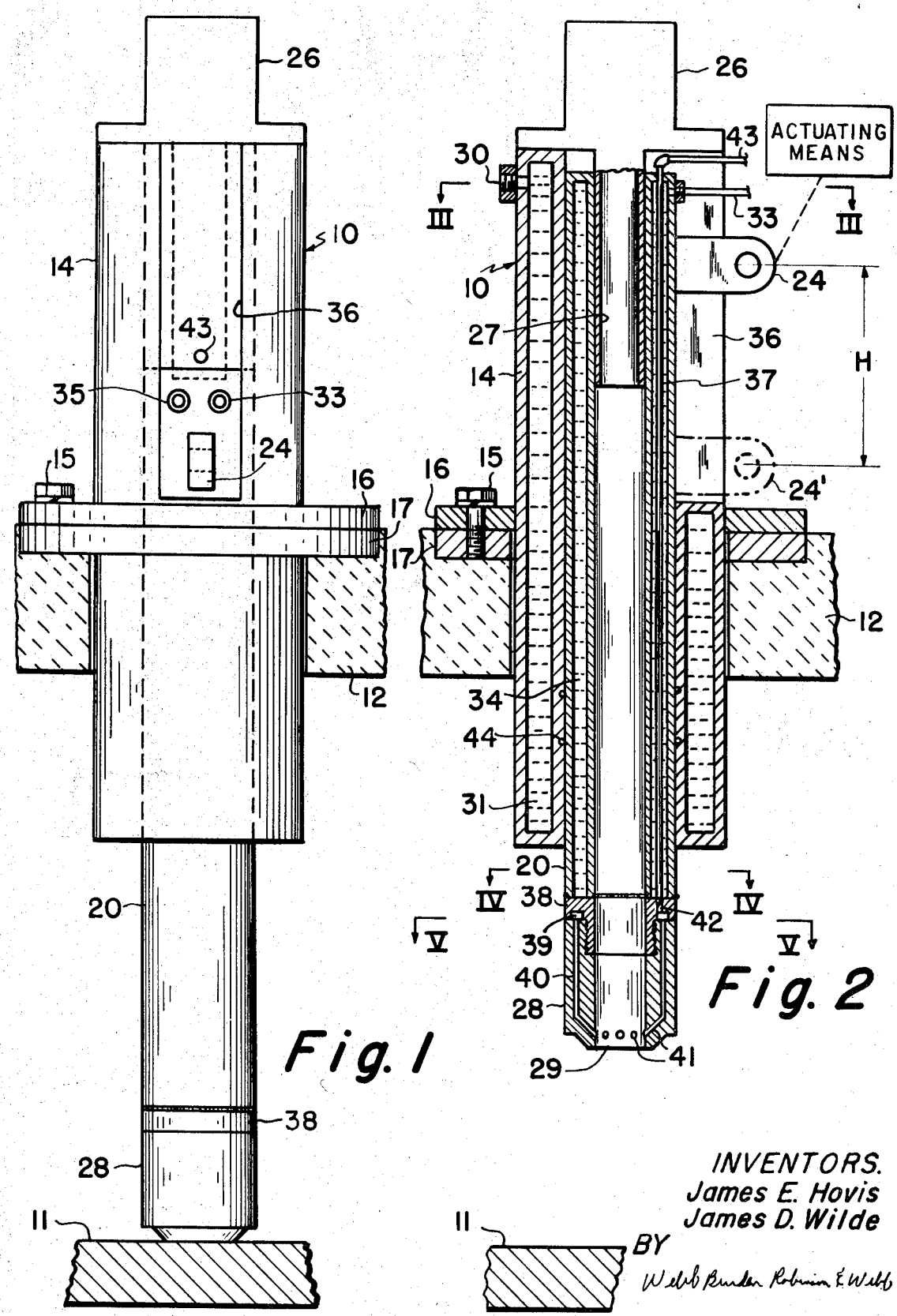

INVENTORS.
James E. Hovis
James D. Wilde
BY
Webb Burden Robinson & Webb
THEIR ATTORNEYS INVENTORS.
James E. Hovis
James D. Wilde
BY
Webb Burden Robinson & Webb
THEIR ATTORNEYS United States Patent Office 3,559,485
Patented Feb. 2, 1971

3,559,485
METHOD AND APPARATUS FOR TEMPERATURE MEASUREMENT IN A METALLURGICAL FURNACE
James E. Hovis, Jefferson Township, Allegheny County, and James D. Wilde, Upper St. Clair Township, Allegheny County, Pa., assignors to Bloom Engineering Company, Inc., Pittsburgh, Pa.
Filed Feb. 25, 1969, Ser. No. 802,168
Int. Cl. G01k 13/04; G01j 5/04, 5/06
U.S. Cl. 73—355                              10 Claims

ABSTRACT OF THE DISCLOSURE

A temperature measuring device and a method for taking solid metal temperatures in a metallurgical furnace comprising a telescoping shield mounted in alignment with a radiation pyrometer and which, just prior to a temperature measurement, extends into the furnace to a point adjacent to the slab. The shield can also be extended in such a manner as to strike the solid metal surface with sufficient impact as to shatter the scale layer on the surface of the metal, which scale is then removed immediately thereafter by means of compressed air jets.

---

This invention relates to a method and apparatus for sensing temperatures of solid metal surfaces in metallurgical furnaces and, more particularly, to a method and apparatus for routinely sensing such temperatures in moving slabs, billets or other shapes in reheating furnaces such as pusher type furnaces, walking beam furnaces, and other similar continuous furnaces.

In recent years large tonnage reheating furnaces have come into existence to meet the ever increasing demands for more efficient operation and higher production of larger slabs, plates, billets, blooms and other shapes. In reheating furnaces, this is usually accomplished by placing banks or zones of burners in the roof or walls of the furnace, and heating and soaking the stock in these separate zones of the furnace, as rapidly as possible, while the stock is moved under or past the burners and through the respective zones of the furnace.

The heating demands of the furnace, however, for efficient operation, are continually being changed as a result of product size changes, mill delays, mill speedups, varying metallurgical requirements or product mix. For each special production condition, there is an ideal heating curve; however, there are so many different operating conditions existing to meet the above-identified changing conditions that the combination of ideal heating curves, when presented in graph form, results in a maze of lines which make adequate control by presently known means virtually impossible by even the most experienced operating personnel. These various combinations of operating requirements and the inadequacies of present known means of control lead to undesirable operating conditions such as slagging of the surface of the metal being heated, nonuniform temperature conditions in the slab being processed, furnace maintenance problems, waste of fuel and quality problems in the finished product, just to name a few.

Furnace temperature in its various zones of control, in multiple zone reheating furnaces, is normally controlled by means of thermocouples or radiamatic temperature sensing devices mounted in and adjacent to the roof and/or walls of each zone of temperature control, which arrangement results in the temperature sensing device reading an average of all the temperatures present in the zone or within the area of influence of the temperature sensing device. Thus, for example, while the furnace wall refractories may be very hot, the charge stock may be very much colder and the sensing device will indicate and/or control fuel input to the zones, based on the respective influences of these various temperatures. It is, thus, obvious that in a zone of control where flame temperature may well be over 3000° F., the refractory roof of the furnace enclosure at 200° F., the refractory walls of the enclosure at 2400° F., and the stock being processed at 1000° F., that temperature zone control by the means described above is a relative measurement only and completely inadequate to obtain close temperature tolerance in the material being heated.

The ideal solution for accurate control of temperature in reheating furnaces is, therefore, by actual temperature measurement of the stock being heated. To accomplish this end, accurate and routine steel temperatures are required throughout the furnace. This aim presents an associated problem to which this invention is directed; namely, how to accurately and routinely take temperatures of scaled-over stock in an atmosphere of flame, smoke, and suspended foreign substance particles in the furnace atmosphere, and the like. For instance, it is known that the total radiation level in a relatively closed zone or chamber drastically affects any reading within that zone. It is also known that semiluminous flames in a zone cause temperature reading variations of several hundred degrees and that the reading of a scaled surface also produces considerable error in temperature measurement, especially in the latter stages of heating and soaking when the scale development has achieved its maximum thickness. However, when an accurate required temperature profile of the slabs throughout the furnace has been determined, automatic methods known to those skilled in the art can be employed to control the heat inputs of the various banks of burners to maintain the approximate ideal heating curve at all times for the particular production conditions being imposed.

Our invention provides a method of routinely taking steel surface temperatures throughout the furnace to accurately maintain the appropriate ideal temperature curves.

Our invention also provides an apparatus for sensing these true and accurate temperatures by means of shielding of the temperature sensing device, usually an open end radiation pyrometer, from all outside furnace influences other than the temperature of the stock being processed. The temperature measurement is taken from a protected position immediately adjacent to the slab. Our invention can also be adapted to physically contact, shatter and remove the scale layer from the surface of the slab or stock being processed prior to sensing the temperature of the workpiece to insure the accuracy of the reading. In addition, our invention encompasses a closed end tube radiation pyrometer for accurately measuring the relative radiation from the slab at a position immediately adjacent thereto.

Our invention provides a radiation pyrometer having a telescoping shield mounted thereto which, immediately prior to an actual temperature measurement being made, extends into the furnace to a position immediately adjacent to the stock whose temperature is to be sensed. Our invention also provides a scale breaking device having compressed fluid jets and affixed to the furnace end of the shield tube for shattering and removing the scale from the stock surface just prior to sensing the temperature of the metal surface. The sequential steps of taking such a temperature measurement are also provided for by our invention.

In the accompanying drawings, we have shown at least one preferred embodiment of our invention in which:

FIG. 1 is a front view showing a radiation pyrometer having a telescoping shield with a scale breaker in the extended position;

FIG. 2 is a section of the apparatus of FIG. 1 shown in the contracted position;

Figure 3:
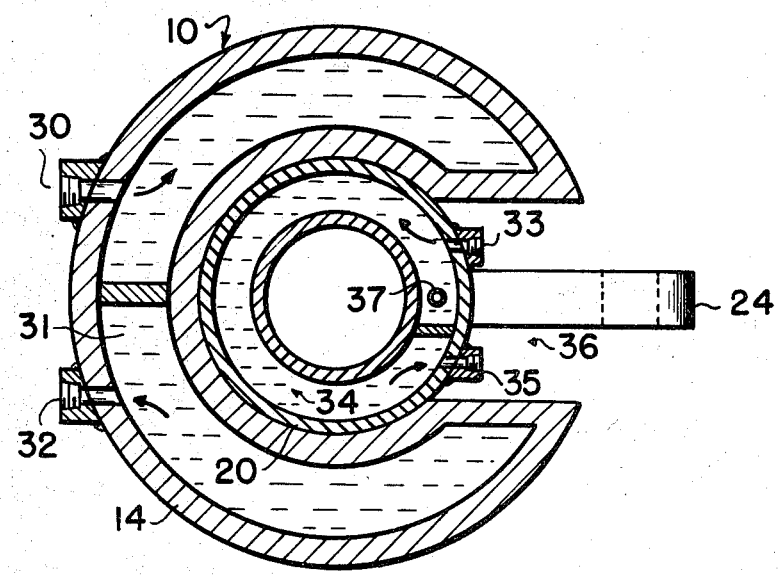
FIG. 3 is a section through section lines III—III of FIG. 2.

While our invention is adaptable to many different metallurgical furnaces and forms of stock, we have shown our temperature measuring device 10 in FIG. 1 positioned in the roof 12 of a hot mill reheating furnace (not shown) in which a steel slab 11 is passing therethrough. Our temperature measuring device 10 comprises a water-cooled outer metal housing referred to as guide tube 14, which is mounted in the roof 12 of the reheating furnace. Guide tube 14 is mounted to the roof 12 by threaded bolts 15 which are placed through holes in outwardly extending flanges 16 welded to guide tube 14 and which cooperate with threaded holes of metal plate 17, which is integral with roof 12, see FIG. 2. Concentrically positioned and slidably mounted within guide tube 14 is retractable open ended sight tube 20. Sight tube 20 is attached to an actuating means (not shown) through lug 24 mounted near the top of and to the sight tube. The actuating means through lug 24 imparts a telescoping motion to extend the sight tube 20 into the furnace and retract it back again. The lug 24 or other suitable attaching means can be actuated in a number of different ways known in the art, such as a piston cylinder arrangement which can be manually or automatically activated at predetermined time intervals. The dotted lug 24' in FIG. 2 shows the position of the lug when the sight tube 20 is in the extended position, as shown in FIG. 1.

Radiation pyrometer 26 is mounted at the top of guide tube 14. The temperature sensing portion (not shown) of pyrometer 26 is positioned facing through the open ended sight tube 20 and toward the steel slab 11 passing through the furnace. A cylindrical sleeve 27 is mounted to pyrometer 26 and extends downwardly therefrom in line with the direction of the temperature sensing portion. When guide tube 20 is in the retracted position shown in FIG. 2, sleeve 27 is concentrically positioned within sight tube 20.

Sight tube 20 is threaded at its bottom end and has a scale breaker 28 with cooperating threads secured thereto. Scale breaker 28 is a relatively thick, hard metallic component having an opening 29 therethrough coaxially aligned with that of sight tube 20. As will be described hereinafter, the scale breaker 28 actually contacts the slab 11 to shatter the scale formed on the surface of slab 11.

Both the guide tube 14 and the sight tube 20 are water cooled. Water enters guide tube 14 at inlet 30, circulates throughout the guide tube 14 in passageway 31 and exits at outlet 32 which also communicates with passageway 31, see FIGS. 2 and 3. Water enters the sight tube 20 at inlet 33, circulates throughout the sight tube 20 in communicating passageway 34 and exits at communicating outlet 35. In FIG. 3 it can be seen that the guide tube 14 is shaped to provide an open area 36 above the roof 12 of the furnace for movement of the lug 24 and the water transporting means (not shown) for telescoping sight tube 20 such as flexible hosing.

Figure 4:
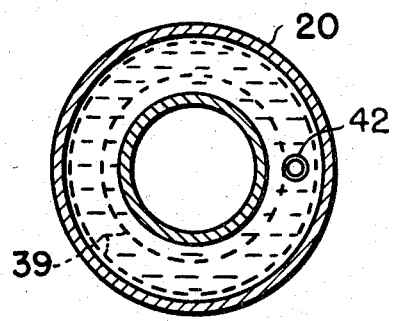
FIG. 4 is a section through section lines IV—IV of FIG. 2.

In addition to the coolant passages 34, sight tube 20 has a compressed air pipe 37 extending from inlet 43 at the top of the sight tube 20 (see FIG. 3) running through the water passageway 20 to a discharge plate 38 welded to the bottom of sight tube 20, see FIGS. 1 and 4. Discharge plate 38 is circular, has an annular groove 39 in its bottom surface, and has a passageway 42 aligned with compressed air pipe 37 and extending through plate 38 into annular groove 39. The compressed air exits into annular groove 39, see FIGS. 2 and 4.

Figure 5:
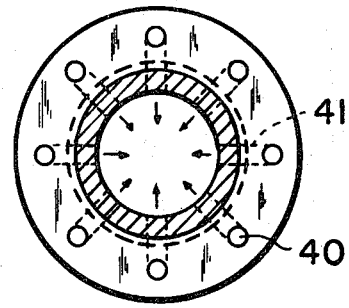
FIG. 5 is a sectional through section lines V—V of FIG. 2.

Scale breaker 28 secured to the bottom of sight tube 20 has a series of vertical passageways 40 extending from the top of scale breaker 28 to a series of openings or jets 41 which exit angularly into the opening 29 of scale breaker 28 substantially at the bottom thereof, see FIGS. 2 and 5. When the scale breaker 28 is mounted to the sight tube 20, the vertical passageways 40 are aligned with the annular groove 39 of discharge plate 38 and a continuous passageway is formed for blowing streams of compressed air onto the slab 11 immediately under the opening 29 of the scale breaker 28. This arrangement permits for ease of replacement of scale breaker 28 which, as will be seen, receives repetitive impacts from being rammed against the steel slab 11.

Because of the presence of hot gases in the furnace atmosphere, a series of seals 44 are positioned between the outer guide tube 14 and the sight tube 20. These seals 41 prevent the hot gases from rising between the two tubes and damaging the temperature sensing device or pyrometer 26.

When the arrangement of FIG. 1 is actuated, sight tube 20 is extended downwardly and the scale breaker 28 strikes the surface of the slab or work being processed 11 with sufficient impact so that the scale breaker 28 shatters the scale on the surface of the slab 11. Immediately thereafter, or simultaneously therewith, the compressed air is activated and it blows the broken scale away from the surface of the slab in the area of impact as the sight tube 20 is retracted slightly.

The short blast of compressed air has no appreciable cooling effect on the slab surface. The temperature reading is then taken with the sight tube in close proximity with the slab. The sight tube 20 in the extended position (FIG. 1) acts as a shield to prevent furnace contamination from the temperature contaminating factors discussed hereinbefore from interfering with the accuracy of temperature reading being taken.

The distance shown as H in FIG. 2 which is the distance that sight tube 20 is extended downwardly, is controlled by the actuation of lug 24 and is a function of the total distance between the end of the scale breaker 28 and the top surface of slab 11. Therefore, the thickness of slab 11 changes the effective distance H, which can be easily controlled for different slab thicknesses.

Figure 7:
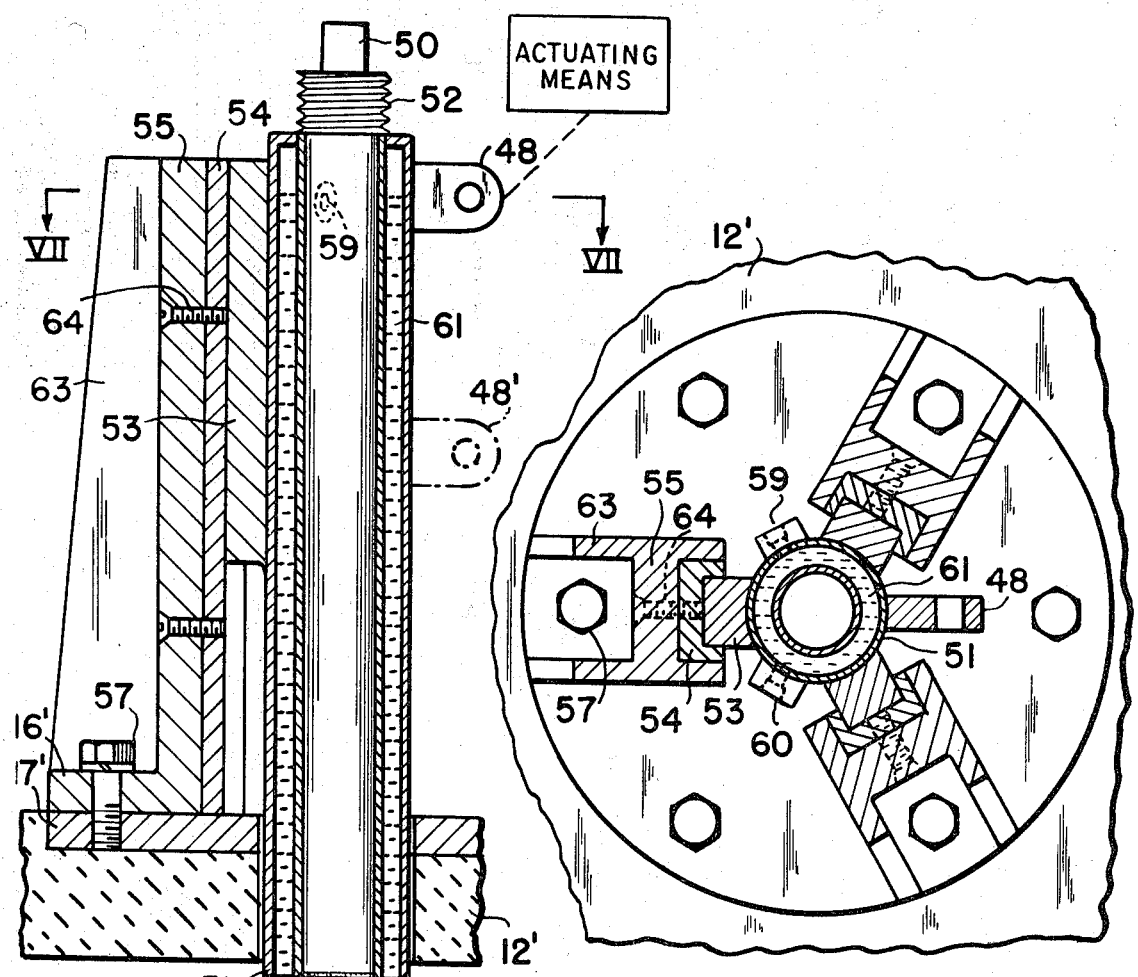
FIG. 7 is a plan view of the apparatus of FIG. 6.
Figure 6:
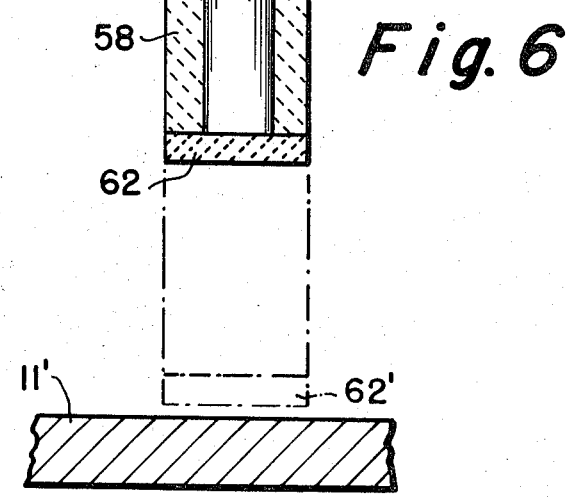
FIG. 6 is a section of a retractable closed end radiation pyrometer.

Another embodiment of our invention is shown in FIGS. 6 and 7 where a closed end radiation pyrometer is adapted for movement to obtain the relative temperature of a steel slab from a position immediately adjacent the slab. Parts similar to those described earlier will be identified by the same numeral, but will be followed by a prime. The framework for the closed end radiation pyrometer comprises three vertical tracks 55 vertically mounted on the roof 12' of the furnace. These tracks 55 are bolted by means of bolts 57 to steel plate 17' in the roof. Gussets 63 support the plates in the vertical position. Mounted to the inside of tracks 55 by means of bolts 64 are metallic slides 54.

The radiation pyrometer 50 is located on top of an open ended sight tube 51. A bellows mounting 52 is positioned between the pyrometer 50 and the sight tube 51 to absorb shock since the pyrometer is movable in this embodiment. Sight tube 51 has three vertically disposed rails 53 mounted thereto. These rails 53 cooperate with and are slidably mounted to the metallic slides 54 of tracks 55, see FIG. 7. Lug 48 is mounted to sight tube 51 and can be actuated in a number of ways known in the art just as the apparatus of FIG. 1.

Sight tube 51 is water cooled with the coolant entering at inlet 59, cooperating with sight tube 51 near the top thereof and circulating throughout sight tube 51 in passageway 61 and exiting at communicating outlet 60.

Sight tube 51 is threaded along its bottom portion. A ceramic tube 58 open at its top end and having threads which cooperate with the threads of sight tube 51 is secured thereto. The bottom of ceramic tube 58 is closed by ceramic plate 62 attached thereto. Ceramic plate 62 can be a number of different compositions, e.g. silicon carbide, well known in the art to function as the closed end of a closed end radiation pyrometer. The sight tube 51 and ceramic tube 58 are extended into the furnace and a temperature is sensed by means of measuring the radiation level from the slab with the bottom plate 62 of the ceramic tube 58 being positioned immediately adjacent to the surface of the slab 11'. The movement in the extended position is shown by lug 48' and dotted plate 62'.

The method of taking steel temperatures with the radiation pyrometer of FIG. 1 is initiated by placing slab 11 under the sensing device of pyrometer 26. The actuating means through lug 24 extends sight tube 20 from the guide tube 14 into the furnace. Sight tube 20 projects downwardly, striking the slab 11 with sufficient impact so that the scale breaker 28 mounted on the end of sight tube 20 shatters the scale on the slab surface. The compressed air system is actuated at the same time the sight tube 20 is raised slightly and the compressed air blows away the scale. The temperature sensing device immediately thereafter takes a reading and then the sight tube 20 is retracted back into guide tube 14. This reading can then automatically be compared with the ideal heating curves and proper adjustments to the burner firing rate automatically carried out. Various combinations of these temperature measuring devices can be utilized in the same metallurgical furnace. For example, the scale breaking device is most effective in the later stages of heating when a heavy scale has accumulated on the slab surface.

Therefore, a plain, retractable sight tube without a scale breaker can be used early in the heating stages or toward the entrance end of the furnace, and the complete scale breaking device can be employed at the latter stages of heating or toward the exit end of the furnace. In addition, the water-cooled sight tube can be replaced by durable ceramic materials.

While compressed air has been cited as the means of removing the shattered scale layer from the surface of the slab, it is understood that steam or other high pressure gaseous means may be employed to achieve this end.

We claim:

1. A temperature measuring apparatus for taking the temperature of a scaled-over metal workpiece passing through a metallurgical furnace comprising:
   (A) A water-cooled, open ended guide tube mounted to the furnace and having a first end entering into the furnace and a second end exiting out of the furnace;
   (B) An open ended hollow walled retractable sight tube slidably mounted within the housing and having a passageway between its ends, said tube having attachment means secured thereto;
   (C) A radiation pyrometer mounted adjacent said second end of the housing and having a radiation sensing means positioned for taking a temperature through the passageway of the sight tube;
   (D) A compresed fluid pipe located within the hollow wall of the sight tube and extending from a fluid inlet at the top of the sight tube to the bottom thereof;
   (E) A discharge plate having an opening therethrough mounted to the bottom of said sight tube, said opening cooperating with the opening of the sight tube, said plate having a circular recess in its bottom surface and a passageway cooperating with the compressed fluid pipe and extending into the circular recess;
   (F) A scale breaker mounted to one of said sight tube and discharge plate, said scale breaker having an opening therethrough cooperating with the opening of the discharge plate and sight tube, said scale breaker having at least one passageway extending from the recess of the discharge plate to the opening in the scale breaker near the bottom end thereof to direct the compressed fluid toward the workpiece; and
   (G) Actuating means secured to the attachment means for extending the sight tube substantially into the furnace to a position adjacent to the workpiece and for retracting the sight tube back into the housing.

2. A method of taking the temperature of a metal workpiece passing through a metallurgical furnace comprising in the following:
   (A) Positioning the workpiece in line with a sensing means of a radiation pyrometer located externally to the furnace chamber;
   (B) Projecting a sight tube from a housing integral with the sensing means substantially into the furnace to a point adjacent the surface of the workpiece;
   (C) Measuring the radiation from the workpiece, said sight tube shielding the sensing means and area of the workpiece from furnace contaminants; and,
   (D) Retracting the sight tube into said housing, said projecting, measuring and retracting taking place while the workpiece is in line with the sensing means.

3. A method of taking the temperature of a metal workpiece passing through a metallurgical furnace comprising:
   (A) Positioning the workpiece in line with a sensing means of a radiation pyrometer located externally to the furnace chamber;
   (B) Projecting a sight tube having a scale breaker mounted thereto and a compressed fluid pipe extending therethrough from a housing integral with the sensing means into the furnace;
   (C) Striking the workpiece with the scale breaker with sufficient force to break up the scale on the surface of the workpiece;
   (D) Retracting sight tube slightly;
   (E) Actuating compressed fluid from the compressed fluid pipe to remove broken scale in the area of the scale breaker;
   (F) Measuring the radiation from the workpiece, said sight tube shielding the sensing means and area of the workpiece from which the temperature is being sensed from furnace contaminants; and
   (G) Retracting the sight tube into said housing.

4. A temperature measuring apparatus for taking the temperature of a workpiece passing through a metallurgical furnace comprising:
   (A) A water-cooled, open ended guide tube adapted to be mounted to a furnace structure and having a first end adapted to enter into the furnace and a second end adapted to exit out of the furnace and to accommodate a radiation pyrometer; and
   (B) An open ended retractable sight tube slidably mounted within the guide tube and having a passageway between its ends to enable a temperature measurement to be taken therethrough, said sight tube having hollow walls defining a coolant passage, said coolant passage connected to inlet and outlet means and adapted to circulate a coolant therethrough, said sight tube adapted to be extended by an actuating means to a position adjacent the workpiece and thereafter to be retracted substantially into the housing.

5. The temperature measuring apparatus of claim 4 having an attachment means secured to the sight tube and an actuating means secured to said attachment means for extending and retracting the sight tube.

6. The temperature measuring apparatus of claim 4 wherein a scale breaker having an opening therethrough is mounted to the end of the sight tube which extends into the furnace, said opening cooperating with the opening of the sight tube to enable a temperature measurement to be taken therethrough.

7. The temperature measuring apparatus of claim 6 having a compressed fluid pipe located within the hollow portion of the wall of the sight tube and extending from a fluid inlet to the bottom of said sight tube, a discharge plate mounted between said sight tube and said scale breaker, said discharge plate having a circular recess in its bottom surface and a passageway cooperating with the compressed fluid pipe and extending into said circular recess, said scale breaker having at least one passageway, said passageway cooperating with the recess of the discharge plate and through the scale breaker and exiting into the opening of the scale breaker near the bottom thereof to direct the compressed fluid toward the workpiece.

8. A temperature measuring apparatus for taking the temperature of a workpiece passing through a metallurgical furnace comprising:
(A) A guide means adapted to be mounted to an opening in the furnace;
(B) A closed end retractable sight tube slidably mounted within the guide means, said sight tube having hollow walls to form a coolant passageway, said passageway connected to inlet and outlet means and adapted to circulate a coolant therethrough, said sight tube adapted to be extended into the furnace by an actuating means to a position adjacent the workpiece and thereafter to be retracted substantially into the guide means; and
(C) A radiation pyrometer cushionably mounted to an end of the sight tube opposite said closed end and having a radiation sensing means positioned for taking a temperature on said closed end when the sight tube is extended to a position adjacent the workpiece.

9. The temperature measuring apparatus of claim 8 wherein said sight tube has a refractory sight tube mounted to the end thereof, said refractory tube having an opening cooperating with the opening of said sight tube to form a continuous passageway therethrough, the refractory sight tube having a closed end whereby the relative temperature is measured from the radiation off the closed end.

10. A temperature measuring apparatus for taking the temperature of a workpiece passing through a metallurgical furnace comprising:
(A) A water-cooled, open ended guide tube adapted to be mounted to a furnace structure and having a first end adapted to enter into the furnace and a second end adapted to exit out of the furnace and to accommodate a radiation pyrometer;
(B) An open ended retractable sight tube slidably mounted within the guide tube and having a passageway between its ends to enable a temperature measurement to be taken therethrough, said sight tube movable with respect to said guide tube to be extended by an actuating means to a position adjacent the workpiece and thereafter to be retracted substantially into the guide tube; and
(C) A scale breaker having an opening therethrough mounted to the end of the sight tube which extends into the furnace, said opening cooperating with the opening of the sight tube to enable a temperature measurement to be taken therethrough, when said sight tube is extended said scale breaker contacting said workpiece to break away a scale layer therefrom prior to a temperature measurement.

References Cited
UNITED STATES PATENTS

| | | | |
|---|---|---|---|
| 1,232,408 | 7/1917 | Thwing | 73—355 |
| 2,054,382 | 9/1936 | Larsen | 73—355 |
| 2,275,265 | 3/1942 | Mead | 73—355 |
| 2,576,514 | 11/1951 | Bianco | 73—355 |

LOUIS R. PRINCE, Primary Examiner

D. E. CORR, Assistant Examiner